A. B. Wilson.

Sewing Mach.

No. 3430. Reissued May 11. 1869.

Inventor.

Witnesses.

Geo. H. Collins.
G. J. Gordon.

Allen B. Wilson

UNITED STATES PATENT OFFICE.

WHEELER & WILSON MANUFACTURING COMPANY, OF BRIDGEPORT, CONN., ASSIGNEE, BY MESNE ASSIGNMENTS, OF ALLEN B. WILSON.

IMPROVEMENT IN SEWING-MACHINES.

Specification forming part of Letters Patent No. 9,041, dated June 15, 1852; extended seven years; reissue No. 3,430, dated May 11, 1869.

*To all whom it may concern:*

Be it known that I, ALLEN B. WILSON, formerly of Watertown, Connecticut, at present residing in the town of Waterbury, county of New Haven and State of Connecticut, have invented certain new and useful Improvements in Sewing-Machines; and that the following, taken in connection with the drawings, is a full, clear, and exact description thereof.

Figure 1:
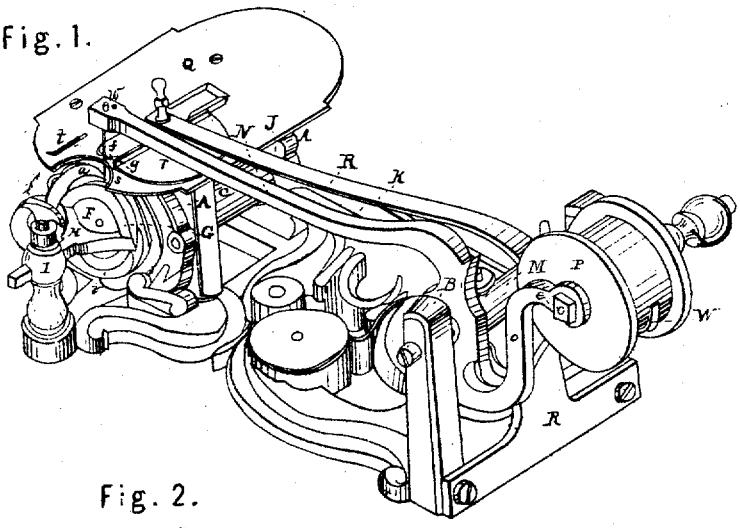
Figure 2:
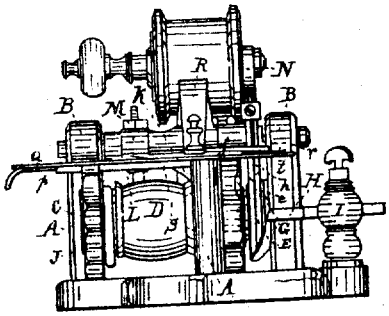
Figure 3:
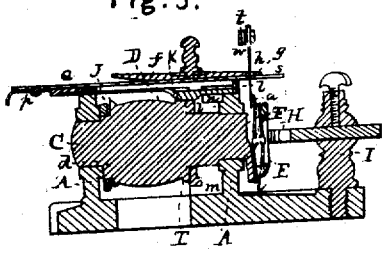
Figure 4:
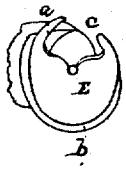
Figure 5:
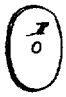
Figure 6:
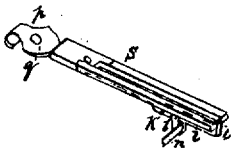

In the drawings, which represent a machine made in accordance with the principles of my invention, Figure 1 is an isometrical perspective view of the whole machine, which I term a sewing-lathe. Fig. 2 is an end elevation of the same. Fig. 3 is a transverse vertical section of the same, taken through the axis of the vertical hook and its shaft. Fig. 4 is a view in perspective of the rotating hook detached from the machine. Fig. 5 is a view of the bobbin which carries the lower thread, which is surrounded at every stitch by loops of needle-thread. Fig. 6 is a view in perspective of the feed-bar and its appendages detached from the machine.

This machine makes stitches according to the mode of operation of a machine of my invention, which is described in Letters Patent bearing date the 12th day of August, A. D. 1851, in as far as that a loop of upper or needle thread of sufficient length to encircle a bobbin is pulled down below the cloth at every stitch, and in so far as this loop is pulled up or tightened by the expansion or pulling out of a succeeding loop, and in so far as loops are seized, expanded, and cast off by a hook so shaped and moved as to effect these objects, but differs therefrom chiefly in the part that the hook is so formed that it will put this loop completely around a bobbin; and this machine, therefore, employs a bobbin which may be stationary in the line of its axis, or nearly so, and this new machine differs in other particulars, which will hereafter be pointed out as new.

The machine feeds the cloth to be sewed in accordance with the principles of a feeding appliance of my invention described in Letters Patent granted to me on the 12th day of November, A. D. 1850, in so far as the material being fed is clamped between a rough and a comparatively smooth surface, and is advanced when the rough surface moves in the direction of the progression of the cloth; but it differs therefrom in the fact that additional motions are imparted to the rough surface, so that it is out of contact with the cloth when it retrogrades to take a fresh hold thereof, and also in the fact that the smooth surface at times clamps the cloth to the reciprocating roughened surface, and at other times to the table or platform of the machine; and this new machine also differs in other points in relation to the feeding apparatus, which will hereafter be specified as new.

The invention which is the subject-matter of this patent may, therefore, be divided into two heads—first, in relation to the stitching mechanism; second, in relation to the feeding mechanism.

In the drawings, the bed-plate, supporting all parts of the machine, which may be screwed upon a proper stand or bench, is represented at A A B B. In the standards A A is supported, in proper bearings, a revolving shaft, C. This shaft carries, or may have formed upon it, a pulley, D, through which, or through other proper instrumentalities, the shaft may be revolved. Near one of the bearings this shaft is turned eccentrically, or has an eccentric mounted upon it, as at *d*, provided with an eccentric ring, J, provided with an eccentric rod, K, whose end is pivoted to a rock-shaft arm, L, which passes through and is secured to a rock-shaft, M, and upon the same rock-shaft is mounted the needle-arm N, which carries the eye-pointed needle *h*, and is extended behind the rock-shaft, as at O, and there provided with a proper spindle, *o*, to support the bobbin P, upon which the upper needle-thread is to be wound. The thread leads from the bobbin through a hole, *w*, on the arm N, and hence through the eye of the needle, and is prevented from unwinding too rapidly by means of a spring-brake, W, attached to the rock-shaft M, and provided with a set or tension screw, (colored yellow in the drawings,) by means of which the proper tension may be put upon the upper thread. This thread being mounted upon the same arm that carries the needle, it follows that the distance between the bobbin and the needle-eye is not affected by the oscillations of the needle, and consequently no slack is formed between the eye and the bobbin. The rock-shaft may be fitted in bearings in the standards B B; but as the sidewise adjustment of the needle with reference to the seizing part of the hook, hereafter to be described, is important, and as it is important, also, to preserve the axis of the rock-shaft always in the same position in spite of wear, I prefer to support the rock-shaft as follows: In each standard is a screw, X, the aperture in the standard being properly threaded to receive it. Each of these screws has a rounded point, and each enters a socket in the rock-shaft, which has a somewhat spherical end or bottom, against which the rounded point of one of the screws bears, thus supporting the shaft. By unscrewing one of the screws and screwing up the other it is evident that the shaft, and consequently the needle, may be adjusted with great nicety sidewise, and it is also evident that when either the bottoms of the sockets or the points of the screws wear the latter may be set up, thus always holding the axis of the shaft in the same position.

When the mandrel revolves the eccentric ring and rod cause the rock-shaft to oscillate, and the needle consequently vibrates in substantially a vertical plane, passing in its vibrations so as to intersect, or nearly so, a prolongation of the axis of the mandrel.

Upon the bed-plate is mounted a table or platform, Q, upon which the cloth is to be laid. This platform may be provided with a gage, *r*, and has so located as to act in combination with it a presser-foot or pressing-plate, *f*, mounted upon a spring-rod, R, attached to the bed-plate. This plate is, therefore, a yielding plate, has a comparatively smooth under surface, is provided with a niche, as at *g*, through which the needle passes, and, when in use, presses the cloth downward, clamping it between its lower surface and the table, as between that same surface and the feeding-tooth. This surface differs in construction in no substantial way from the upper stationary smooth surface of my machine patented November 12, 1850. Upon the end of the mandrel is mounted the rotating hook E. It consists essentially of a hook proper, *a*, and of a groove, *e*, somewhat like the cant between two threads of a screw, leading from the throat of the hook proper, and vanishing at *b* upon the front of the hook, and as a whole it is an annular or disk-shaped projection, cut away so as to form the hook, grooved on the periphery, about one-third around, with a chamfer, on which the groove vanishes, and with a portion of the disk cut away, (see especially Fig. 4,) so that the needle may strike down sufficiently toward or past its axis. This hook enters between the thread and the needle, thus seizing a loop, expands this loop as it revolves, (see arrow, Fig. 1,) passes one part of the loop behind, and the other part in front of, a bobbin, and finally, as the hook turns point upward, casts off this loop, or permits it to be drawn off, and its shape and motion enable it to perform these functions.

The lower thread, to be used in connection with the upper thread in making the stitches, is wound upon a bobbin, F, (see especially Fig. 5,) somewhat like those used in lace-making machines, the heads of it being, by preference, dished, with the concavities turned toward each other, so that there is a considerable space between them at the center, and so that their edges nearly touch. This bobbin is to lie partially inclosed in the dish or cup shaped cavity of the hook, and is held there by a ring, G, mounted upon a forked rod, H, which slides in a standard, I, and may be clamped therein by a set-screw. This lower thread-bobbin lies between the hook and the ring, the latter being so adjusted that the bobbin may not be pinched, but free to turn upon its own axis, and so that thread may pass between the hook and the bobbin, and between the ring and the bobbin. The ring is also provided with a leather pad, *v*, which bears upon the periphery of the hook at and about that point thereof which is lowest, whose use will hereafter be described.

If both bobbins be wound with thread and in place, the needle threaded, the cloth laid under the presser-foot, and the end of the lower thread be drawn up between the spring *s* and the platform, and so into the notch in the platform through which the needle descends, and thence under the little spring *t*, the machine, if provided with a proper feed apparatus, will be ready for operation; the object of passing the lower thread as described being merely to place it properly for the formation of the first stitch, and the end should be held by the finger till the first stitch is finished. When the needle descends it pierces the cloth, carries a loop between it, and, rising a little, slacks the loop; just then the seizing part of the hook enters (see Figs. 2 and 3) between the thread and the needle, and seizes a loop. As the needle rises, the hook, revolving, pulls out or expands this loop, which lies, one part in the groove *c*, the other part in front of the hook on that side nearest the ring G. As the hook continues to revolve it draws the front part of the loop downward behind the bobbin, and when the vanishing part of the groove gets far enough down, the thread therein rolls off over the chamfer, and lies between the bobbin and the ring, (in front of the bobbin.) The bobbin is thus surrounded by a loop of needle-thread, and consequently the bobbin-thread, extending from the bobbin to the under side of the cloth, is surrounded by the same loop when cast off. Meantime the point of the needle has risen above the cloth, the cloth has been fed, and the needle descends, pierces it again, about or before the time that the loop rolls over the chamfer. In descending it (the needle) endeavors to pull up the expended loop, one part of the thread of which it is composed leading up to and through the cloth, thence down again through the cloth to the eye of the needle, and as it endeavors to pull up the loop it strains it sufficiently tight to cause part of it to roll over, so as to lie, as before described, in front of the bobbin. When the seizing part of the hook has rotated so far that its point points upward, the loop is free to slip off, but is held between the hook and the pad or cushion until the strain is sufficient to pull it out from between them. As the hook continues to rotate it seizes a new loop, and, in expanding, this new loop pulls up the first loop, so that the first furnishes the greater part of the thread for the second, the remainder coming from the bobbin of needle-thread. When the first loop is pulled tight it surrounds the under thread, and draws it into the thickness of the cloth, each stitch being, after it is finished, like those made on the Howe sewing-machine.

The action of the pad or cushion is important, as it prevents entangling of the loops, and also any tendency of the hook to catch the same loop a second time. The functions of the hook, which are dependent upon its shape and motion, are, therefore, first, to seize a loop; second, to expand it, and, while expanding, pass it completely around a bobbin; and, third, to cast the loop off.

The moving feeding-surface in this machine consists of a tooth, *l*, formed on a rod, *k*, which at the end farthest from the tooth forms a spring, and is attached to a slotted bar, S, the rod lying in the slot, and the spring always tending to force the tooth down. The bar S is supported in two rabbets or notches on the standards A A, and is free to slide therein in right lines, and it is provided with two pendants, *i i*. A spring, *n*, bears against these pendants, and tends always to force the bar, rod, and tooth backward or away from the revolving hook. Upon the mandrel there is cam T, which is, in fact, a double cam, being of greatest diameter at the point *m*, and being at or about the same point made to extend forward, (see Fig. 3,) so as to act as a face-cam. This cam lifts and advances the tooth by a positive motion, the rod *k* is held down by virtue of its own spring upon the periphery of this cam, and the pendants *i i* are pressed by the spring *n* against its face, so that the tooth is moved downward and rearward by springs. Behind the bar lies an eccentric, *p*, pivoted under the platform at *q*, and the tooth lies under a slot in the table, through which it projects at the time of feeding.

The operation of these parts is as follows: When the cam revolves to the right position it lifts the rod, and consequently the tooth, until the latter projects through the slot, comes in contact with the cloth, and grasps the cloth between the tooth and the lower side of the presser-foot. The face part of the cam then strikes the pendants and moves the tooth forward, carrying the cloth impressed upon it by the presser-foot forward, the cloth being held up by the cam while it is advancing. After the cloth is fed the cam permits the tooth to drop out of engagement with or free itself from the cloth, and then the presser-foot clamps the cloth to the platform and holds it at rest. The face prominence of the cam then leaves the pendants, and the spring *n* forces the tooth back to the place whence it commenced to move.

The cam must be so shaped as to perform the operation above stated when aided by the springs, and it is clear that the tooth, when acted upon by the cam and springs, has four motions, or motions in four directions, viz: first, upward toward the cloth; second, forward longitudinally in the line of progress of the seam; third, downward away from the cloth; and, fourth, rearward, out of contact with the cloth to the place of beginning. The motion forward in the direction of the line of progress of the seam takes place when the needle is out of the cloth.

If the eccentric or rotary wedge be so turned that the end of the bar will never strike against it, the length of each stitch will be equal to the whole amount of projection upon the face of the cam; but if the eccentric be turned so that the bar strikes against it when forced rearward by the spring, then the length of stitch will be shortened, and the amount that it is shortened will depend upon the distance through which the eccentric is turned, and consequently upon the diminished rearward motion of the bar. This contrivance for adjusting the length of the stitch is simple and convenient.

I claim as of my invention—

1. In combination with an eye-pointed reciprocating needle, a hook so shaped and moved, substantially as specified, as to act upon loops of needle-thread, substantially as described.

2. In combination with a hook shaped and moved substantially as specified, a bobbin containing under or lower thread, located in reference to the hook, substantially as set forth.

3. In combination with an eye-pointed needle, a hook and a bobbin, all operating in combination to form a stitch, substantially in the manner specified.

4. A ring, in combination with a hook and bobbin, all operating substantially as specified.

5. In combination with a hook shaped and operating substantially as specified, a pad, constructed and operating substantially as described.

6. In combination, an eye-pointed needle, hook, bobbin, and pad, all operating substantially as set forth.

7. The method, substantially as herein described, of mounting a rock-shaft which carries a needle-arm, whereby the needle may be adjusted, substantially as hereinbefore set forth.

8. The device herein described for feeding the cloth along in a sewing-machine, consisting of a tooth having an upward motion for grasping the cloth between itself and a smooth surface, a motion forward for feeding the cloth along, a downward motion for freeing the tooth from the cloth, and a backward motion, out of contact with the cloth, substantially as above set forth.

9. A tooth having four motions, substantially in the manner and for the purposes set forth, in combination with a surface bearing upon the cloth with a yielding pressure, and a slotted platform, whereby the cloth is not only fed, but is also clamped, so as to be held at rest between the platform and the yielding surface at certain times in the operation of the parts, the combination being and operating substantially as described.

10. A tooth, operating as described, in combination with a cam for lifting the tooth and moving it forward, and a spring for moving it backward, the combination being substantially such as described.

11. The relative arrangement, substantially as herein described, of a rod to which a tooth is attached, beneath a platform, and a cam beneath the rod and acting upon it.

12. A feeding-tooth having four motions, as described, in combination with a slotted platform, in such manner that the tooth rises at times through the slot above the level of the platform, as described.

13. In combination with a feeding-tooth moved forward by a positive motion, as described, and rearward by a spring, an eccentric acting substantially as described, whereby the extent of forward motion is determined, substantially as set forth.

ALLEN B. WILSON.

Witnesses:
GEO. H. COLLINS,
THOS. J. BALDWIN.